3,658,986
IMMUNIZATION METHODS AGAINST TOXIC EFFECTS OF BACTERIAL INFECTION

Victor N. Tompkins, 524 Madison Ave., Albany, N.Y. 12208; Kent D. Miller, 36 Font Grove Road, Slingerlands, N.Y. 12159; Thelma F. Muraschi, R.D. 2, Box 123A, Altamont, N.Y. 12009; and John W. Fenton II, 11 Paul Holly Drive, Loudonville, N.Y. 12211
No Drawing. Filed July 2, 1969, Ser. No. 838,680
Int. Cl. A61k 19/00
U.S. Cl. 424—88      2 Claims

ABSTRACT OF THE DISCLOSURE

The toxic effects of infection by elastase-elaborating bacteria are minimized by immunizing susceptible animals against bacterial elastase.

---

This invention relates to methods for minimizing the toxic effects of infection by elastase-elaborating bacteria.

The importance of elastase-elaborating bacteria as the pathogen in a variety of infections has increased considerably over the years. Of particular significance is the increasing incidence of Pseudomonas infection in leukemia patients, or following severe wounding or thermal injury wherein the natural defense mechanism against bacterial infection is impaired. Pseudomonas infection is a serious complicating factor in such situations because of its elastase-induced necrotizing effect on vascular and connective tissue.

Generally speaking, antibiotics are ineffective against established Pseudomonas infection. Vaccines have been prepared, but being derived from somatic antigens, are of little value against other strains of the same organism. Further, such vaccines contain extraneous cellular matter which may induce allergenic reactions and proteases from the organism may destroy the host defense mechanisms unless neutralized.

We have now discovered that the toxic effects of infection by elastase-elaborating bacteria such as Pseudomonas can be minimized by immunizing susceptible animals against bacterial elastase using bacterial elastase as the antigen.

In its active immunization aspect, the present invention is a method for minimizing the toxic effects of infection by elastase-elaborating bacteria which comprises parenterally administering to a susceptible animal purified bacterial elastase in an amount sufficient to elicit antibody formation in the animal.

In its passive immunization aspect, the present invention is a method for minimizing the toxic effects of infection by elastase-elaborating bacteria which comprises parenterally administering to susceptible animals immune serum containing antibodies against bacterial elastase.

The present invention is illustrated by particular reference to Pseudomonas organisms. However, the protective methods of the invention are applicable to the immunization of susceptible animals against the toxic effects of infections by other elastase-elaborating organisms.

Most if not all virulent strains of P. aeruginosa elaborate a protease exhibiting elastolytic activity. The enzyme, designated elastase, is specific and varies very little from strain to strain. While minor species differences in elastase do occur, a common thread of cross-antigenicity pervades the genus.

Most bacterial vaccines, including polyvalent vaccines, are derived from somatic antigens and are of little value against strains of the organism not included in vaccine preparation. Unlike conventional prior art vaccines, the antigen utilized in the method of the present invention is free and independent of strain- and species-specific somatic antigens. Thus, the method of the present invention does not merely immunize susceptible animals against particular elastase-elaborating bacteria but against the toxic effects of the elastase as such.

P. aeruginosa elastase can be prepared and purified by the method of Morihara et al., Journal of Biological Chemistry, 240, 3295 (1965). As noted by Johnson et al., Canadian Journal of Microbiology, 13, 711 (1967) improved yields of elastase are obtained when the organism is cultivated on an agar medium and the elastase is extracted from the agar. It cannot be too strongly emphasized that the elastase used in practicing the methods of the present invention must be carefully purified.

After trying many modifications, our best method for the isolation and purification of elastase is as follows:

Seed cultures of elastase-producing strains of Pseudomonas are grown overnight in beef broth or another fluid nutrient medium and these cultures are utilized to inoculate solid trypticase. After 18–24 hours, incubation at 30° C., the surface growth of cells is harvested, suspended in 0.15 M KCl, shaken with glass beads and the cell debris removed by centrifugation. Crude elastase is precipitated by addition of four volumes of cold ethanol. After refrigeration at 5° C. overnight, the precipitated material is collected by high-speed centrifugation and dissolved in a volume of water equal to one-tenth the original cell extract volume. The soluble material is dialyzed against 0.002 M phosphate buffer at pH 7.5 and then applied to diethylaminoethyl cellulose columns previously equilibrated with the same buffer. The columns are developed at 5° C. with linear salt gradients prepared from the above equilibration buffer and an equal volume of 0.03 M phosphate buffer also at pH 7.5. The elastase obtained using this ion-exchange chromatographic procedure usually meets immunochemical and physiochemical criteria for purity; the procedure may be repeated if necessary.

The purified elastase is suspended in physiological or buffered saline at a concentration of about 1 mg. of elastase per ml. of saline (the suspension has a spectrophotometric optical density of 2.8 at 420 m$\mu$). The stock suspension is then serially diluted to the desired test concentrations.

One milliliter of diluted suspension containing Freund's complete adjuvant is intraperitoneally administered in single or repeated doses to laboratory mice weighing about 13–15 grams. Eleven or twelve days later, the mice now weighing about 22–25 grams are challenged by intraperitoneal administration of a suspension containing a virulent strain of P. aeruginosa prepared by growing the organism in a nutrient beef broth for about 4–5 hours and then serially diluting with 4% gastric mucin. Death, when it occurs, is usually within 48 hours of challenge and is established as due to infection with the challenging organism.

As would be expected, immunity is increased by administering repeated doses of the antigen-containing suspension. The results obtained in the active immunity mouse protection tests as of the fourth day after challenge are summarized below:

a 100× minimum lethal dose. The same amount of serum diluted 1/40 afforded protection against a 10× minimum lethal dose of the challenging organism.

| Day of immunization | Day of challenge | Dilution of immunogen | Survival ratios on challenge with culture dilutions of— | | | Survival ratios of non-immunized controls gixen challenge culture dilutions of— | | | |
|---|---|---|---|---|---|---|---|---|---|
| | | | $10^{-5}$ | $10^{-6}$ | $10^{-7}$ | $10^{-6}$ | $10^{-7}$ | $10^{-8}$ | $10^{-}$ |
| 1 | 11 | $10^{-2}$ | 6/10 | 8/10 | 7/10 | 0/10 | 5/10 | 3/10 | 7/10 |
| | | $10^{-4}$ | 5/10 | 7/10 | 9/10 | | | | |
| | | $10^{-6}$ | 6/10 | 7/10 | 10/10 | | | | |
| | | $10^{-8}$ | 9/10 | 10/10 | 10/10 | | | | |
| 1 and 8 | 18 | $10^{-2}$ | 10/10 | 10/10 | 10/10 | 1/10 | 3/10 | 3/10 | 1/10 |
| | | $10^{-4}$ | 8/10 | 9/10 | 8/9 | | | | |
| | | $10^{-6}$ | 7/10 | 10/10 | 9/10 | | | | |
| | | $10^{-8}$ | 9/10 | 10/10 | 10/10 | | | | |
| 1 and 8 | 20 | $10^{-3}$ | 8/9 | 6/10 | 9/10 | 0/10 | 0/10 | 0/10 | 0/10 |
| | | $10^{-6}$ | 4/10 | 8/10 | 8/10 | | | | |
| | | $10^{-9}$ | 7/10 | 6/10 | 7/10 | | | | |
| | | $10^{-12}$ | 2/10 | 6/10 | 6/10 | | | | |
| 1 | 11 | $10^{-1}$ | 6/9 | 9/10 | 8/10 | 2/10 | 2/10 | 7/10 | 7/10 |
| | | $10^{-3}$ | 2/10 | 6/10 | 4/10 | | | | |
| | | $10^{-5}$ | 6/10 | 9/10 | 7/10 | | | | |
| | | $10^{-6}$ | 9/10 | 9/10 | 10/10 | 1/10 | 3/10 | 0/10 | 6/10 |
| 1 and 8 | 12 | $10^{-8}$ | 8/9 | 8/10 | 9/10 | | | | |
| | | $10^{-10}$ | 6/10 | 8/10 | 10/10 | | | | |
| | | $10^{-12}$ | 7/10 | 10/10 | 10/10 | | | | |
| 1 and 8 | 10 | $10^{-3}$ | 6/9 | 5/10 | 7/10 | 0/9 | 0/9 | 0/10 | 3/10 |
| | | $10^{-6}$ | 5/9 | 8/10 | 7/10 | | | | |
| | | $10^{-9}$ | 2/9 | 2/10 | 8/10 | | | | |
| | | $10^{-12}$ | 2/10 | 5/9 | 6/10 | | | | |
| 1 and 7 | 11 | $10^{-3}$ | 7/10 | 6/10 | 10/10 | 0/10 | 5/10 | 0/10 | 4/10 |
| | | $10^{-6}$ | 6/10 | 10/10 | 9/9 | | | | |
| | | $10^{-9}$ | 7/10 | 10/10 | 10/10 | | | | |
| | | $10^{-12}$ | 8/10 | 9/9 | 10/10 | | | | |

In all series but the last shown, the elastase was obtained from *P. aeruginosa* Habs' type 0:6—strain 332-1369. In the last series, the elastase was obtained from Habs' type 0:10—strain B 319. The challenge organism in the first, second, third and last series was the homologous strain 332. In the fourth and fifth series, the challenge organism was Habs' type 0:10—strain 319; in the next to last series shown, the challenge organism was Habs' type 0:2—strain 112. The latter two are particularly virulent strains recently isolated from seriously ill patients.

Immune serum was prepared by intramuscularly injecting rabbits with 1 ml. of an adjuvant-containing a 1/1280 dilution of elastase from *P. aeruginosa* Habs' type 0:6—strain 332-1369. This dosage was repeated three weeks after the first inoculation and booster shots at a dilution of 1/2560 were given each week thereafter. Blood samples were taken and serum prepared and tested for imparting passive immunity to mice against challenge as described above.

On 18 hours' challenge with the homologous strain, 0.5 ml. of the rabbit serum at a dilution of 1/320 protected the challenged mice against a 100× minimum lethal dose. The same amount of serum at a dilution of 1/80 protected the challenged mice against a 1000× minimum lethal dose. On challenge with a strain of heterologous serotype, 0.5 ml. of the rabbit serum at a dilution of 1/20 protected the challenged mice against The immunogen-containing suspension must be parenterally administered to the animal to be protected or to the source of immune serum. The suspension usually contains a conventional adjuvant, such as Freund's complete adjuvant, to promote antibody production. Administration in the field would most likely be by subcutaneous or intramuscular injection.

Other variations falling within the scope of the invention will suggest themselves to those skilled in the art and our invention is as claimed.

We claim:

1. A method for minimizing the toxic effects of infection by elastase-elaborating bacteria of the genus Pseudomonas which comprises parenterally administering to a susceptible animal purified elastase isolated from Pseudomonas bacteria in an amount sufficient to elicit antibody formation in the animal.

2. A method according to claim 1 wherein the elastase-elaborating bacteria is *P. aeruginosa*.

References Cited

McIvor et al., J. Immunology, vol. 82, pp. 328-331, 1959.

McIvor et al., J. Immunology, vol. 88, pp. 274-276, 1962.

RICHARD L. HUFF, Primary Examiner

U.S. Cl. X.R.

424—85, 92, 94